United States Patent
Staiger et al.

(10) Patent No.: US 8,840,748 B2
(45) Date of Patent: Sep. 23, 2014

(54) METHOD FOR GLUING HEAT-ACTIVATED GLUEABLE SURFACE ELEMENTS

(75) Inventors: Anja Staiger, Hamburg (DE); Klaus Keite-Telgenbüscher, Hamburg (DE); Judith Grünauer, Hamburg (DE); Hans Karl Engeldinger, Quickborn (DE)

(73) Assignee: tesa SE, Hamburg (DE)

( * ) Notice: Subject to any disclaimer, the term of this patent is extended or adjusted under 35 U.S.C. 154(b) by 0 days.

(21) Appl. No.: 13/264,941

(22) PCT Filed: Oct. 8, 2010

(86) PCT No.: PCT/EP2010/065073
§ 371 (c)(1),
(2), (4) Date: Dec. 29, 2011

(87) PCT Pub. No.: WO2011/051097
PCT Pub. Date: May 5, 2011

(65) Prior Publication Data
US 2012/0279647 A1 Nov. 8, 2012

(30) Foreign Application Priority Data
Oct. 30, 2009 (DE) .................. 10 2009 046 256

(51) Int. Cl.
*B29C 65/14* (2006.01)
*B29C 65/00* (2006.01)
*C09J 5/06* (2006.01)
*B29C 65/48* (2006.01)
*B29C 65/36* (2006.01)
*C09J 7/02* (2006.01)
*B29C 65/50* (2006.01)
*B29C 65/82* (2006.01)

(52) U.S. Cl.
CPC .............. *C09J 5/06* (2013.01); *B29C 65/5014* (2013.01); *B29C 66/73113* (2013.01); *B29C 66/949* (2013.01); *B29C 66/929* (2013.01); *B29C 66/959* (2013.01); *B29C 66/43* (2013.01); *B29C 65/4855* (2013.01); *B29C 65/3696* (2013.01); *B29C 65/3644* (2013.01); *B29C 66/1122* (2013.01); *B29C 65/8215* (2013.01); *B29C 65/364* (2013.01); *B29C 65/5057* (2013.01); *B29C 66/9592* (2013.01); *B29C 65/8246* (2013.01); *C09J 7/0292* (2013.01); *B29C 65/368* (2013.01); *B29C 66/71* (2013.01)
USPC ...................................... 156/272.2

(58) Field of Classification Search
CPC B29C 65/14; B29C 65/3644; B29C 65/4855; B29C 65/5057; B29C 65/368; B29C 65/364; B29C 65/3699; B29C 65/5014; B29C 65/8215; B29C 65/8246; B32B 37/06; B32B 37/26
USPC ................................ 156/272.2, 272.4, 273.9
See application file for complete search history.

(56) References Cited

U.S. PATENT DOCUMENTS

| | | | |
|---|---|---|---|
| 3,467,806 A * | 9/1969 | Dixon Austin | 219/659 |
| 4,029,837 A * | 6/1977 | Leatherman | 442/16 |
| 4,528,057 A * | 7/1985 | Challenger et al. | 156/273.7 |
| 4,836,691 A * | 6/1989 | Suzuki et al. | 383/80 |
| 2004/0031568 A1 | 2/2004 | Lin | |
| 2005/0103430 A1 | 5/2005 | Smith | |
| 2008/0196831 A1 | 8/2008 | Friese | |
| 2010/0116314 A1 * | 5/2010 | Fukushima et al. | 136/244 |

FOREIGN PATENT DOCUMENTS

| | | |
|---|---|---|
| EP | 1475424 B1 | 5/2003 |
| EP | 1956063 A2 | 8/2008 |
| EP | 2146355 A1 | 1/2010 |
| JP | 57073064 A1 | 5/1982 |
| WO | 2008139994 A1 | 11/2008 |
| WO | WO 2008139994 A1 * | 11/2008 |

OTHER PUBLICATIONS

Chinese Office Action of corresponding Chinese Application No. 201080030818.8 dated Jan. 20, 2014.

* cited by examiner

Primary Examiner — Daniel McNally

(74) Attorney, Agent, or Firm — Norris McLaughlin & Marcus, P.A.

(57) ABSTRACT

A method glues a heat-activated glueable surface element to an adhesive substrate which does not conduct electric current, whereby a surface thereof has only a low thermal conductivity. The heat-activated glueable surface element has an electrically conductive layer in addition to a heat-activated adhesive mass. The layer is inductively heated for a short time in an alternating magnetic field at a frequency from a middle frequency range. A high pressure of at least 1 MPa is exerted on the gluing surface simultaneously to the inductive heating, whereby preventing thermal decomposition reactions is possible. Further, a device performs the method and has an induction heater integrated in a press tool.

19 Claims, 6 Drawing Sheets

METHOD FOR GLUING HEAT-ACTIVATED GLUEABLE SURFACE ELEMENTS

Figure 1:
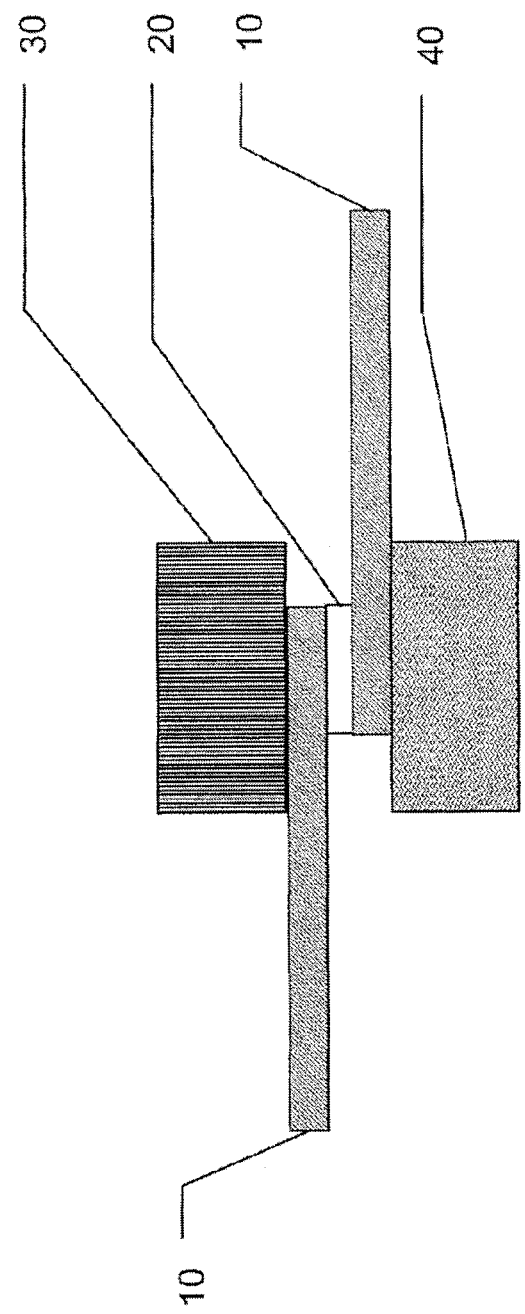

This is a 371 of PCT/EP2010/065073 filed 8 Oct. 2010 (international filing date), and claims the priority of German Application No. 10 2009 046 256.2 filed 30 Oct. 2009.

The invention relates to a method for adhesively bonding a heat-activatedly bondable sheetlike element to an electrically nonconducting bond substrate which has a thermal conductivity coefficient of at most 5 W/mK, the method comprising the steps of providing a heat-activatedly bondable sheetlike element having at least one electrically conducting layer and at least one heat-activatedly bonding adhesive layer, its shape cut to the shape of the bond area, the contacting of the bond substrate with a side-face section of the heat-activatedly bondable sheetlike element, to form a preliminary assembly, and the inductive heating of the preliminary assembly in an alternating magnetic field at a frequency of at least 100 Hz and at most 200 kHz for a duration of at most 20 s, to form a final assembly. The invention further relates to a device having at least one press-ram element.

Heat-activatedly bondable sheetlike elements (heat-activateable sheetlike elements) are used in order to obtain high-strength connections between adherends. Especially suitable are sheetlike elements of this kind for achieving, in the case of a relatively thin bondline, strengths comparable with or higher than those possible with sheetlike elements which contain exclusively pressure-sensitive adhesive systems. Such high-strength bonds are important particularly in light of the ongoing miniaturization of electronic devices, in the consumer electronics, entertainment electronics or communications electronics segment, for instance, as for example for cell phones, PDAs, laptops and other computers, digital cameras and display devices such as displays and digital readers, for instance.

The requirements in terms of proccessability and stability of adhesive bonds increase particularly in portable consumer electronics articles. One reason for this is that the dimensions of such articles are becoming ever smaller, and so the area that can be utilized for an adhesive bond is also reduced. Another reason is that an adhesive bond in such devices must be particularly stable, since portable articles are required to withstand severe mechanical loads such as impacts or drops, for instance, and, moreover, are to be used across a broad temperature range.

In such products, therefore, it is preferred to use heat-activatedly bondable sheetlike elements which have heat-activatedly bonding adhesives, i.e., adhesives which at room temperature have no inherent tack, or at best a slight inherent tack, but which, when exposed to heat, develop the bond strength needed for a bond to the respective bond substrates (adherends, adhesion base). At room temperature, heat-activatedly bonding adhesives of this kind are frequently in solid form, but in the course of bonding, as a result of temperature exposure, are converted either reversibly or irreversibly into a state of high bond strength. Reversibly heat-activatedly bonding adhesives are, for example, adhesives based on thermoplastic polymers, whereas irreversibly heat-activatedly bonding adhesives are, for instance, reactive adhesives, in which thermal activation triggers chemical reactions such as crosslinking reactions, for example, thereby making these adhesives particularly suitable for permanent high-strength bonds.

A feature common to all heat-activatedly bonding adhesive systems is that for bonding they must be heated. Particularly in the case of bonds where the adhesive systems are hidden from the outside by the bond substrates over their full area, it is particularly important for the heat necessary for melting or for activating the adhesive to be transported toward the bond area rapidly. If one of the bond substrates here is a good thermal conductor, then it is possible to heat that bond substrate by means of an external heat source, as for example through a direct heat transfer medium, an infrared heater or the like.

In the case of such direct heating or contact heating, however, the short heating time that is needed for rapid, homogeneous heating of the adhesive can be realized only for a large temperature gradient between the heat source and the bond substrate. Consequently, the bond substrate that is to be heated ought itself to be insensitive with respect to temperatures which may in some cases even be considerably higher than would actually be necessary for the melting or activation of the adhesive.

The situation is different, however, if none of the bond substrates is a sufficiently good thermal conductor or if the bond substrates are sensitive toward higher temperatures, as is the case, for example, with many plastics, but also with electronic components such as semiconductor components or liquid-crystal modules, for instance. For the bonding of bond substrates made from low thermal conduction materials or heat-sensitive materials, therefore, it is appropriate to equip the heat-activatedly bondable sheetlike element itself with an intrinsic mechanism for heating, and so the heat needed for bonding need not be introduced from the outside, but is instead produced directly in the interior of the sheetlike element itself. In the prior art there are various mechanisms known that allow such internal heating to be realized, in the form, for instance, of heating by means of an electrical resistance heater, through magnetic induction or by interaction with microwave radiation.

The two last-mentioned methods, in relation to the progression of adhesive bonding and the practical technical embodiment of the external heating device which interacts with the heat-generating region of the sheetlike element and so brings about heating of the sheetlike element, offer the advantage that the heating of the sheetlike element does not require immediate and direct contact of the sheetlike element with the external heating device; instead, such heating may even be carried out without contact. In this context, in particular, heating by magnetic induction has emerged as being practical, since a heating device operating on the induction principle is considerably simpler to construct, in terms of apparatus, than is a microwave emitter.

Different effects may contribute to the heating in an alternating magnetic field: If the body introduced into the alternating field for heating has electrically conducting regions, then eddy currents are induced in those regions by the alternating magnetic field. Where these regions have a nonzero electrical resistance, the accompanying eddy current conduction losses result in the occurrence of Joule heat (resistive heat). In order for such eddy currents to be able to form at all, the electrically conductive regions, however, must possess a certain minimum size; the lower the frequency of the externally applied alternating magnetic field, the larger this certain minimum size.

However, if the body introduced into the alternating field for heating has ferromagnetic regions, then the elementary magnets of these regions are each aligned in parallel to the external alternating magnetic field. The hysteresis losses (magnetic reversal losses) that occur during the change in the external magnetic field likewise result in the heating of the body. Depending on the material of which the body introduced into the alternating magnetic field consists, both effects may contribute jointly to the heating of the body (as for instance with ferromagnetic metals such as iron, nickel, and cobalt or with ferromagnetic alloys such as Mu-metal and alnico), or else in each case only one of these two effects may contribute to the heating (for instance, only eddy currents in the case of nonferromagnetic metals such as aluminum, or only hysteresis in the case of low electrical conduction materials such as iron oxide particles).

Already known for a number of decades in manufacturing technology have been devices and methods on the basis of inductive heating that allow polymer systems to be heated, as for example for the bonding of adherends, for the sealing of seams arising in manufacture, and for the curing or annealing of polymers. The heating devices here typically include inductors for generating the alternating magnetic field, in each case partly or entirely surrounding the body to be heated, and heating it uniformly along its whole periphery. In this context it is of course also possible, as and when necessary, to realize a deliberately nonuniform heating. For this purpose, in practice, use is frequently made, for example, of tunnellike induction coils, since with this geometric arrangement the alternating magnetic field of the induction coil acts not just from one direction, but instead, in addition, from the side as well on the body that is to be heated.

If heat-activatedly bondable sheetlike elements are thermally activated by inductive heating, this is generally done using sheetlike elements which as hot-applied adhesive comprise a heat-activatedly bonding adhesive disposed on the side faces of an electrically conducting layer, such as a two-dimensional structure with a foil comprising a metal or a metallized polymer, a perforated metal foil, a wire mesh, a two-dimensionally spread expanded metal, a metal nonwoven or metal fibers. The latter discontinuous two-dimensional structures offer the advantage that the hot-applied adhesive can pass through the openings in the respective two-dimensional structure and, as a result, the internal cohesion of the sheetlike element overall is improved, albeit it then at the expense of a decrease in the efficiency of the heating.

One of the disadvantages of the existing methods is that it is not only the specific region of the respective body that is to be heated which is exposed to the alternating magnetic field, but always a considerably larger region of the body; this is evident particularly in the case of an arrangement in which the body to be heated is introduced completely into a tunnellike induction coil and hence is also exposed completely to the alternating magnetic field. As a result, conventional methods of this kind for inductive heating can be employed for the bonding only of those bond substrates for which thermal or electrical damage to the regions unwantedly exposed to the alternating magnetic field is not a possibility. This, however, means that the existing methods for the bonding of subassemblies in electronic devices can generally not be used, since many of the electronic components, such as semiconductor components or display modules, for instance, have only limited heat resistance and may therefore be damaged on heating, and especially since these subassemblies frequently themselves contain electrically conducting regions, with the consequence that inductive heating occurs within these subassemblies as well.

In recent years, inductive heating for adhesive bonding has moved back under the spotlight. The reason for this is to be found in the nanoparticulate systems that are now available, such as MagSilica™ (Evonik AG), for example, which can be incorporated into the material of the body to be heated and which thus allow heating of the body throughout its volume, without any attendant significant detriment to its mechanical stability. For adhesive bonds in mobile electronic devices, for example, the Lohmann company offers a product under the Duplocoll RCD™ name, which contains inductively heatable nanoparticles.

Because of the small size of these nanoscopic systems, however, it is not possible to bring about efficient heating of such products in alternating magnetic fields with frequencies from the medium frequency range. For the innovative systems, instead, frequencies from the high frequency range are required. It is at these frequencies in particular, however, that the problem of damage to electronic components in an alternating magnetic field is manifested to a particularly severe extent. Generating alternating magnetic fields with frequencies in the high frequency range, moreover, requires increased cost and complexity of apparatus, and is therefore unfavorable economically. Furthermore, the use of nanoparticulate fillers is a problem from the standpoint of the environment as well, since these fillers are not easily separated from their surrounding materials on subsequent recycling.

In principle, a variety of heating devices for inductive heating are known; one of the parameters which can be used to distinguish them is the frequencies possessed by the alternating magnetic field generated using the heating device in question. For instance, induction heating may be accomplished using a magnetic field whose frequency is situated in the frequency range from about 100 Hz to about 200 kHz (the so-called medium frequencies; MF) or else in the frequency range from about 300 kHz to about 100 MHz (the so-called high frequencies; HF). In addition, as a special case, there are also heating devices known whose magnetic field possesses a frequency from the microwave range, such as the standard microwave frequency of 2.45 GHz, for example.

Rising in line with the frequency of the alternating field used is the technical cost and complexity involved in generating the alternating field, and hence the costs of the heating device. Whereas middle-frequency systems are already currently available at a market price of approximately 5000 euros, the outlay for high-frequency systems is at least 25 000 euros. Also rising in line with the frequency, furthermore, are the safety requirements concerning the heating system, and so, for high-frequency systems, it is regularly necessary, to the higher acquisition costs, to add higher costs for the installation of such technology as well.

In view of the associated higher costs and the greater risk of damage in the bonding of electronic components, and also in light of the poorer recyclability, therefore, the nanoparticulate systems are not especially suitable for use as a constituent of heat-activatedly bondable sheetlike elements for inductive heating for the purpose of gentle adhesive bonding. To achieve this objective, it is preferable to use alternating magnetic fields with frequencies from the medium frequency range.

Even with heating devices which operate with alternating magnetic fields having frequencies from the medium frequency range, however, it has proven difficult to realize gentle adhesive bonding. In order to obtain the high processing speeds that are necessary for industrial manufacturing processes, the time taken for the heat-activatedly bondable sheetlike elements to heat up must only be very short. To achieve the required bonding temperatures, therefore, it is necessary to select a very high heating rate.

If the heat-activatedly bondable sheetlike element is bonded, however, to a bond substrate which has a low thermal conductivity, i.e., a thermal conductivity of at most 5 W/mK, the heat generated inductively in the sheetlike element cannot be conducted away from it with sufficient speed. The heat, instead, first remains for a certain time in the bond area, thus leading to a heat jam. As a consequence of this, the sheetlike element and the bond substrate (electronic components, for instance) may be overheated locally and damaged as a result. This danger of overheating is even greater if the bond substrate possesses not only a low thermal conductivity but also a low heat capacity, since this means that there is no possibility of temporary heat storage.

Both of these factors affect, for example, bond substrates which have polymers on the bond area. Owing to the smaller free path length of the phonons, polymers possess a lower thermal conductivity than metals and also, because of the smaller number of degrees of freedom in polymer chains, have a low heat capacity. A further factor is that the thermal stability of polymers is frequently less than that of other substrate materials, such as of metals or glasses, for example.

In this context it is of course even more problematical if not only the bond substrate but also, furthermore, the other constituents of the sheetlike element (such as the carrier or further functional layers) are composed of such materials with low thermal conductivity and heat capacity, since in that case it is not even possible for there to be heat removal or heat storage via the sheetlike element.

At the present time, then, there exists no generally applicable bonding method with which bond substrates can be gently connected via heat-activatedly bondable sheetlike elements in high cycle rates by subjecting the sheetlike elements to an alternating magnetic field with a frequency from the medium frequency range. Instead, in the case of inductive heating, thermal damage to the sheetlike element or to a bond substrate is observed especially when the bond substrate has a polymeric bond area, particularly when the substrate in question is an electronic component.

It was an object of the present invention to provide a method which can be used, while avoiding the disadvantages of the prior art, to produce small-area bonds on bond substrates which do not conduct electrical current and which have a low thermal conductivity coefficient. This method, furthermore, must also be suitable for the bonding of subassemblies of electronic devices with high cycle rates, especially for the bonding of bond substrates made of polymers.

This object is achieved in accordance with the invention by means of a method of the type specified at the outset wherein the preliminary assembly, simultaneously with the inductive heating, is subjected, vertically to a side-face section of the heat-activatedly bondable sheetlike element, to a pressure (pressing pressure) of at least 1 MPa, more particularly of at least 3 MPa, to bring the adhesive into full-area contact with the bond substrate. The directional indication "vertically to a side-face section of the heat-activatedly bondable sheetlike element" in this case means that, for a flat adhesive bond in which the sheetlike element is in planar form (and hence also its two side faces), a pressing force acts (either solely or additionally) perpendicularly with respect to the principal extent of the sheetlike element, whereas, for a three-dimensionally curved bond, a pressing force acts in a direction perpendicular to one of the principal extents of the sheetlike element and hence, at least in one subregion, perpendicularly to the side faces of the sheetlike element.

Surprisingly, with this method, success has been achieved in carrying out reliable heating, and hence bonding, even of very small bond areas, of the kind customary in mobile electronic devices, for instance, within a short time by means of induction heating in the medium frequency range, without causing damage to the electronics or to other metallic components or polymers. It has been observed, instead, that when the adhesive bond to be produced, simultaneously with the inductive heating, has been subjected in the nascent state to a high pressure, the risk of damage occurring in the course of inductive heating was drastically reduced. In this way, a particularly simple method is provided that is suitable for a large number of bond substrates, and with which even subassemblies with electronic components such as semiconductor components or display modules can be joined with a high strength.

In this context it is possible, moreover, to limit the inductive heating to the area of the bondline, something which can be improved still further by using a heat-activatedly bondable sheetlike element in the form of a corresponding cut shape, if the alternating magnetic field has been concentrated in the direct vicinity of the bondline, such as by integrating the inductor into the pressing tool.

In one advantageous embodiment, the method is carried out such that the heat-activatedly bondable sheetlike element provided is a sheetlike element which has a further heat-activatedly bonding adhesive layer, and that the preliminary assembly, prior to the inductive heating, is contacted with a further bond substrate, the further heat-activatedly bonding adhesive layer of the heat-activatedly bondable sheetlike element of the preliminary assembly being contacted with the further bond substrate. In this way, two or more identical or else different bond substrates can be joined to one another in a single inductive heating step, and at the same time the heat-up duration can be reduced overall.

The heating rate in the case of the inductive heating is advantageously at least 2.5° C./s and at most 200° C./s, more particularly at least 10° C./s and at most 100° C./s. As a result of the minimum heating rate thus selected, the time needed for the bonding of the heat-activatedly bonding adhesives can be reduced further and, as a result, the cycle rate for bonding can be increased further. By limiting the heating rate to low heating rates, furthermore, the danger of thermal damage to the adhesives or to the bond substrates is reduced, and the uncontrolled melting of the adhesive and unwanted melting of the bond substrate are avoided.

The method is particularly suitable when the heat-activatedly bondable sheetlike element provided is a sheetlike element in which, as the at least one electrically conducting layer, a layer having a layer thickness of less than 75 μm is used, more particularly of less than 30 μm or even of less than 15 μm. By this means the heating rate of the sheetlike element is limited toward the upper end in a particularly simple way technically.

It is of advantage, furthermore, if the heat-activatedly bondable sheetlike element provided is a sheetlike element whose shape is adapted for an open bond area geometry. Sheetlike elements having such geometry cannot be homogeneously and shape-preservingly bonded in the existing methods for inductive heating, or can be thus bonded only with great cost and complexity in those methods, and so the extension of the principle of the invention to systems of this kind affords a further considerable benefit.

Provided as the heat-activatedly bondable sheetlike element, furthermore, may be a sheetlike element having a minimum strut width of less than 5 mm, more particularly of less than 3 mm or even of less than 2 mm. Only through use of the method of the invention is it possible to enlarge the area available for an adhesive bond, even when only little area is available for the bonding of bond substrates, and hence to increase the strength of the bond overall, without causing thermal damage to those regions of low strut width. Such small lateral structures cannot be used, or can be used at most only with great cost and complexity, in the existing bonding methods by means of inductive heating.

It is useful, furthermore, if the bond substrate used is a bond substrate which has a bond area curved in three-dimensional space. This is a particularly simple means of realizing even three-dimensionally configured bond area profiles, since it allows homogeneous heating of the heat-activatedly bonding adhesive layer over its entire two-dimensional extent. Curved bond areas of this kind are frequently generated, for instance, in the bonding of display panes or casings in mobile electronic devices.

As a further step, in accordance with the invention, the pressure may be maintained even after the end of inductive heating, for a subsequent pressing duration, with the final assembly being inductively heated again for at least part of the subsequent pressing duration. This has the advantage that the adhesive bond, by virtue of the sustained pressure, can solidify further and, in the solidified form, can be subjected to a subsequent cure, and so, as a result of the increase in cohesion achieved by this means in the adhesive, the strength of the bond overall is increased.

Furthermore, the ratio of the area of the region of the heat-activatedly bondable sheetlike element that is heated inductively at the same time to the bond area in this region may be less than 2:1, more particularly less than 1.5:1 or even less than 1.2:1. By operating the method in such a way, the risk of the bond substrate being thermally damaged in the course of inductive heating is further reduced, since local heating takes place essentially only in the region at which bonding is also actually intended. Accordingly, the amount of heat generated is reduced, and so only a smaller amount of heat need also be dissipated.

For realizing the concept of the invention, the inductive heating and the pressure exposure may be carried out using a device having at least one press-ram element which has an induction heating means. Through use of such a device, with which both key aspects of the method can be carried out by means of one and the same tool, the method sequence can be accelerated and the cycle number can be increased, since there is no need to tailor pressing device and induction device (inductor) to one another, and, furthermore, the otherwise separate positioning of pressing device and inductor can now be carried out in a single step. This device is preferably installed in a fixed location, in order to ensure the operational reliability needed in the context of the high pressing pressure to be used in accordance with the invention.

As set out above, the method of the invention affords particular advantages when it is used for bonding subassemblies of electronic devices, since otherwise such bonds cannot be formed in high cycle numbers without an increased risk of the electronic components being thermally damaged in the operation.

In accordance with a further aspect of the present invention, a further object was to provide a device which is particularly adapted to carrying out the method of the invention and which in particular allows inductive heating of a heat-activatedly bondable sheetlike element for the bonding of the sheetlike element on a bond substrate with low heat capacity without thermal or electrical damage. The existing devices only allow inductive heating of the bond, during which the bond substrates are fixed only weakly by means of a holding device, without any significant pressing pressure being exerted on said substrates. The exertion of a pressing pressure requires direct contact with the surface of the body to be bonded. Moreover, in the existing devices, the inductor is located at a certain distance from the sheetlike element, thereby reducing the three-dimensional resolution of the energy input on inductive heating in accordance with the prior art.

These problems are solved by a device of the type specified at the outset, in which the at least one press-ram element has an induction heating means and in which the device is adapted for a pressing force of at least 300 N, more particularly of at least 600 N. Through the integration of the inductor directly into the press-ram element it is possible to minimize the distance between the inductor and the sheetlike element, and so the disadvantages described above are overcome.

In one advantageous embodiment, the at least one press-ram element has, at least regionally, a pressing face which is curved in three-dimensional space. In this way, as well as two-dimensionally planar bonds, bonds with three-dimensionally shaped bond areas can be obtained as well, and so, moreover, complex bond geometries are accessible.

The device is particularly suitable when it has a further press-ram element which has at least one ferromagnetic, ferrimagnetic, paramagnetic or diamagnetic yoke section—preferably a ferrimagnetic yoke section—or a further induction heating means. A yoke section of this kind deforms the magnetic field and thus increases its penetration depth, and so, in particular, bonds with complex bond geometries are heated homogeneously and hence offer uniform adhesion and cohesion over the entire bond area. A locally acting boost of the alternating magnetic field can also be achieved through the use of a further induction heating means.

In order to illustrate the invention, it is described in general below, and, for this purpose, certain representative examples of individual constituents of partial aspects of the invention are elucidated, and can be linked almost arbitrarily with one another in dependence on the properties desired in each case.

Fundamentally, therefore, the invention relates to a method for the bonding of a heat-activatedly bondable sheetlike element to a particular kind of bond substrate. A sheetlike element for the purposes of this specification is considered to encompass in particular all customary and suitable structures having substantially sheetlike extent. These structures allow two-dimensional bonding and may take various forms, more particularly may be flexible, as an adhesive sheet, adhesive tape, adhesive label or shaped diecut.

Such sheetlike elements each have two side faces, a front face and a back face. The terms "front face" and "back face" here refer to the two surfaces of the sheetlike element parallel to its principal extent (two-dimensional extent, principal plane of extent) and serve merely to distinguish these two faces, disposed on opposite sides of the sheetlike element, without the choice of the terms determining the absolute three-dimensional arrangement of the two faces; accordingly, the front face may also constitute that side face of the sheetlike element that lies at the back three-dimensionally, namely when, accordingly, the back face forms the side face thereof that lies at the front three-dimensionally.

This heat-activatedly bondable sheetlike element is to be bonded to a bond substrate. For this purpose, on at least one of its two side faces, the sheetlike element has a heat-activatedly bonding adhesive, preferably in fact on both side faces. Heat-activatedly bonding adhesives are all adhesives which are bonded hot at elevated temperatures and, after cooling, afford a mechanically robust connection. The adhesive is present typically in the form of an adhesive layer.

A layer is more particularly a sheetlike arrangement of a system of unitary functionality whose dimensions in one spatial direction (thickness or height) are significantly smaller than in the two other spatial directions (length and width), which define the principal extent. A layer of this kind may be compact or else perforated in form, and may consist of a single material or of different materials, particularly when these materials contribute to the unitary functionality of said layer. A layer may have different thicknesses or else a thickness which is constant over its entire two-dimensional extent. Furthermore, of course, a layer may also have more than one single functionality.

The sheetlike element to be bonded in the present context comprises at least two different layers, these being at least one electrically conducting layer and at least one heat-activatedly bonding adhesive layer. An electrically conducting layer is considered to be any layer of at least one material that has a conductivity (electrons and/or holes) at 23° C. of at least 1 mS/m, thus allowing an electrical current flow in said material. Such materials are, in particular, metals, semimetals, and also other metallic materials, and possibly also semiconductors in which the electrical resistance is low. Accordingly, the electrical resistance of the electrically conducting layer is on the one hand high enough to allow heating of the layer when an electrical current is flowing in the layer, but on the other hand also low enough for a current flow to be actually established through the layer. Also considered to be electrically conducting layers, as a special case, are layers of materials which have a low magnetic resistance (and hence a high magnetic conductivity or magnetic permeability), examples being ferrites, although these frequently have a relatively high electrical resistance given alternating currents of low frequencies, and so heating here is frequently achieved only with alternating magnetic field frequencies that tend to be relatively high.

The at least one electrically conducting layer may in principle be of any suitable design—for example, a thin layer perforated or else compact over its full area, with a layer thickness of less than 75 µm, more particularly of less than 30 µm or even of less than 15 µm. The latter allows the heating rate to be limited toward the top end in a relatively simple way.

The electrically conducting layer may consist of all customary and suitable materials, such as of aluminum, copper, gold, nickel, Mu-metal, alnico, permalloy, ferrite, and the like. This electrically conducting layer is preferably also magnetic as well, more particularly ferromagnetic or paramagnetic. Although it is expected of such materials that, in addition to the induction of eddy currents, there will also be heating in the materials as a result of hysteresis losses, and that the heat-up rate overall will be greater, it has been observed, in contrast, that even magnetic materials such as nickel or magnetic steels, which are good conductors of electrical current, in fact have lower heat-up rates than materials which, while being good conductors of electrical current, are themselves not magnetic, examples being copper, aluminum, carbon nanotubes or graphenes. Through use of magnetic materials which conduct electrical current, therefore, the heat-up can be more easily controlled and the incidence of heat-up effects outside of the bondline can be reduced.

Alternatively, however, it may also be advantageous for the electrically conducting layer to be diamagnetic, i.e., to possess a magnetic permeability of less than 1 and a susceptibility of less than 0. Examples of such materials are, for instance, copper, silver, lead, and tin, and also all superconducting materials. In tests which such systems it was found that, because of the lower skin effect, the heat-up rates achievable with these materials are higher than with paramagnetic or ferromagnetic materials having a similar electrical conductivity. Accordingly, a method in which a high heating rate of more than 100° C./s is achievable even for thin layers with a thickness of less than 15 µm, through use of a diamagnetic layer, may also be useful. In addition to the at least one electrically conducting layer, the sheetlike element may of course also have further electrically conducting layers; these layers may be identical to or different from the at least one electrically conducting layer.

Overall, the heat-activatedly bondable sheetlike element may be of any suitable design. Thus the sheetlike element, in addition to the two layers described above, may comprise further layers, examples being permanent carriers or temporary carriers. Furthermore, the sheetlike element may be designed to be bondable on only one of its two side faces or to be bondable on both side faces, in the form, for instance, of a single-sidedly bondable or double-sidedly bondable adhesive tape. In the latter case, the sheetlike element has at least one further adhesive layer, which may be identical to or different from the at least one heat-activatedly bonding adhesive. Accordingly, the further adhesive layer may comprise, for example, a heat-activatedly bonding adhesive or even a pressure-sensitive adhesive.

As the at least one heat-activatedly bonding adhesive it is possible in principle to employ all customary heat-activatedly bonding adhesive systems. Heat-activatedly bonding adhesives can be divided in principle into two categories: thermoplastic heat-activatedly bonding adhesives (hotmelt adhesives), and reactive heat-activatedly bonding adhesives (reactive adhesives). This subdivision also includes those adhesives which can be assigned to both categories, namely reactive thermoplastic heat-activatedly bonding adhesives (reactive hotmelt adhesives).

Thermoplastic adhesives are based on polymers which soften reversibly on heating and solidify again in the course of cooling. In contrast to these, reactive heat-activatedly bonding adhesives comprise reactive components. The latter constituents are also referred to as "reactive resins", in which heating initiates a crosslinking process which, after the end of the crosslinking reaction, ensures a permanent stable bond even under pressure. Thermoplastic adhesives of this kind preferably also comprise elastic components, examples being synthetic nitrile rubbers. Such elastic components give the heat-activatedly bonding adhesive a particularly high dimensional stability even under pressure, on account of their high flow viscosity.

Described below, purely by way of example, are a number of typical systems of heat-activatedly bonding adhesives which have emerged as being particularly advantageous in connection with the present invention.

A thermoplastic heat-activatedly bonding adhesive, then, comprises a thermoplastic base polymer. This polymer has good flow behavior even under low applied pressure, and so the ultimate bond strength that is relevant for the durability of a permanent bond comes about within a short applied-pressure time, and, therefore, rapid bonding is possible even to a rough or otherwise critical substrate. As thermoplastic heat-activatedly bonding adhesives it is possible to use all of the thermoplastic adhesives known from the prior art.

Exemplary compositions are described in EP 1 475 424 A1, for instance. Hence the thermoplastic adhesive may comprise, or even consist of, for example, one or more of the following components: polyolefins, ethylene-vinyl acetate copolymers, ethylene-ethyl acrylate copolymers, polyamides, polyesters, polyurethanes or butadiene-styrene block copolymers. Employed preferably, for instance, are the thermoplastic adhesives listed in paragraph [0027] of EP 1 475 424 A1. Further thermoplastic adhesives, particularly suitable especially for specific fields of use such as the bonding of glass bond substrates, for example, are described in EP 1 95 60 63 A2. It is preferred to use thermoplastic adhesives whose melt viscosity has been raised by rheological additives, as for example through addition of fumed silicas, carbon black, carbon nanotubes and/or further polymers as blend components.

A reactive heat-activatedly bonding adhesive, in contrast, advantageously comprises an elastomeric base polymer and a modifier resin, the modifier resin comprising a tackifier resin and/or a reactive resin. Through the use of an elastomeric base polymer it is possible to obtain adhesive layers having outstanding dimensional stability. As reactive heat-activatedly bonding adhesives it is possible, in line with the specific requirements in each case, to use all of the heat-activatedly bonding adhesives that are known from the prior art.

Also included here, for example, are reactive heat-activatedly bonding sheets based on nitrile rubbers or derivatives thereof such as, for instance, nitrile-butadiene rubbers or mixtures (blends) of these base polymers, additionally comprising reactive resins such as phenolic resins, for instance; one such product is available commercially under the name tesa 8401, for instance. On account of its high flow viscosity, the nitrile rubber gives the heat-activatedly bonding sheet a pronounced dimensional stability, allowing high bond strengths to be realized on plastics surfaces after a crosslinking reaction has been carried out.

Naturally, other reactive heat-activatedly bonding adhesives can be used as well, such as, for instance, adhesives comprising a mass fraction of 50% to 95% by weight of a bondable polymer and a mass fraction of 5% to 50% by weight of an epoxy resin or a mixture of two or more epoxy resins. The bondable polymer in this case comprises advantageously 40% to 94% by weight of acrylic acid compounds and/or methacrylic acid compounds of the general formula $CH_2=C(R^1)(COOR^2)$ ($R^1$ here represents a radical selected from the group encompassing H and $CH_3$, and $R^2$ represents a radical selected from the group encompassing H and linear or branched alkyl chains having 1 to 30 carbon atoms), 5% to 30% by weight of a first copolymerizable vinyl monomer which has at least one acid group, more particularly a carboxylic acid group and/or sulfonic acid group and/or phosphonic acid group, 1% to 10% by weight of a second copolymerizable vinyl monomer which has at least one epoxide group or an acid anhydride function, and 0% to 20% by weight of a third copolymerizable vinyl monomer which has at least one functional group different from the functional group of the first copolymerizable vinyl monomer and from the functional group of the second copolymerizable vinyl monomer. An adhesive of this kind allows bonding with rapid activation, the ultimate bond strength being achieved within just a very short time, with the result, overall, that an effectively adhering connection to a nonpolar substrate is ensured.

A further reactive heat-activatedly bonding adhesive which can be used, and which affords particular advantages, comprises 40% to 98% by weight of an acrylate-containing block copolymer, 2% to 50% by weight of a resin component, and 0% to 10% by weight of a hardener component. The resin component comprises one or more resins selected from the group encompassing bond strength enhancing (tackifying) epoxy resins, novolak resins, and phenolic resins. The hardener component is used for crosslinking the resins from the resin component. On account of the strong physical crosslinking within the polymer, a formulation of this kind affords the particular advantage that adhesive layers having a high overall thickness can be obtained, without detriment overall to the robustness of the bond. As a result, these adhesive layers are particularly suitable for compensating unevennesses in the substrate. Moreover, an adhesive of this kind features good aging resistance and exhibits a low level of outgassing, a particularly desirable feature for many bonds in the electronics segment.

As already mentioned above, however, apart from these particularly advantageous adhesives, it is also possible in principle to select and use all other heat-activatedly bonding adhesives in line with the particular profile of requirements for the adhesive bond.

The first aspect of the invention now relates to a method for adhesively bonding such sheetlike elements to at least one bond substrate which possesses a low thermal conductivity, thus having a thermal conductivity coefficient of at most 5 W/mK; this means, therefore, that at least the surface of the adherend must have such a low thermal conductivity. For this purpose, the surface of the bond substrate may carry, over much or part of its area, a ceramic material, polymeric material or glasses. In the consumer electronics segment, for example, it is common to use polyvinyl chloride, acrylonitrile-butadiene-styrene, polycarbonate, polypropylene, polyethylene terephthalate, polyethylene naphthalate, polymethyl methacrylate and also polybutylene terephthalate, or mixtures based on these plastics. Frequently as well, moreover, nonconducting, thin surface layers are employed, layers for instance based on silicon oxide or aluminum oxide. Where different bond substrates are bonded to one another, the surfaces of the bond substrates may be identical, similar or different in terms of their materials.

The bond substrate overall may of course have any suitable design and may have, for example, an at least regionally uniformly planar surface on which the adhesive layer of the sheetlike element is to be bonded. The surface of the sheetlike element, however, may also be of regularly or irregularly bowed design, and so the bond substrate has a bond area which is curved three-dimensionally in three-dimensional space.

For this method to be implemented, first of all the above-described heat-activatedly bondable sheetlike element is provided. The shape of the sheetlike element is adapted to the shape of the bond area, and so the sheetlike element is present in the form, for instance, of a cut-to-size blank or diecut. This means that its shape corresponds approximately or precisely to the shape of the bond areas of the components to be joined, and hence to the lateral shape of the bondline. With such sheetlike elements, typically, the dimensional stability and bonding strength requirements are particularly high. The fact that the sheetlike element is provided in the geometry of the bond area ensures that heating takes place only in the regions of the area that are needed for bonding. Hence the risk of thermal damage can be reduced even more effectively. The shaping of the sheetlike element here may be done by means of all of the shaping parting methods that are familiar to the skilled person—in other words, for instance, as parting by the principle of through-pressing (diecutting), blade cutting, shears cutting, laser cutting or waterjet cutting.

The shape of the sheetlike element here may in particular be adapted for an open bond area geometry, meaning that the bondline between the sheetlike element and the at least one bond substrate takes the form of a noncontinuous area. This comprises areas which are perforated by cutouts, and also areas composed essentially of linear elements and therefore possessing a sort of comb structure or finger structure. Particular suitability is possessed here by those comb structures or finger structures in which the individual elements—more particularly their central rib elements and also branching rib elements—have a ratio of length to width (aspect ratio) of more than 2.

Additionally or instead, the minimum strut width of the bond regions of the sheetlike element (and hence also the minimum strut width of the sheetlike element itself) can be less than 3 mm or even less than 2 mm. Sheetlike elements having such thin minimum strut widths cannot readily be bonded by means of inductive heating with the existing bonding methods. Use of the method of the invention is particularly advantageous if the heated area at which the heat-activatedly bondable sheetlike element is in contact with the at least one bond substrate or with all of the bond substrates is very small, i.e., smaller than 5 cm². Even in the case of such fine bond substrates, the method can be used to prevent uncontrolled melting of the adhesive.

For joining, the bond substrate is contacted with a side-face section of the heat-activatedly bondable sheetlike element, and so a part or the entire area of one of the two side faces contacts a region of the surface of the bond substrate, forming a preliminary assembly, i.e. an assembly which exists temporarily prior to the actual conclusive joining.

This preliminary assembly is exposed for a duration of at most 20 s to a medium-frequency alternating magnetic field, i.e., one with a frequency of at least 100 Hz and at most 200 kHz, and hence is heated inductively in this alternating magnetic field. Alternating magnetic fields of these frequencies afford a sufficiently suitable penetration depth, and for this reason it is preferred to use alternating magnetic fields with frequencies of 1 kHz to 40 kHz, more particularly of less than 15 kHz, allowing the effective penetration depth of the magnetic field to be increased overall without the need for an increased level of cost and complexity in terms of apparatus. As a consequence of the inductive heating, the at least one heat-activatedly bonding adhesive, which is in contact with the at least one bond substrate, is activated, thus forming a final assembly (that is, an assembly, obtained by adhesive bonding, comprising a sheetlike element and at least one bond substrate joined directly to a side face of the sheetlike element). The maximum duration of 20 s here is necessary in order to ensure sufficiently high heat-up rates and hence a high processing rate as well.

For the realization of the inventive concept it is absolutely necessary for the preliminary assembly to be subjected, in the course of inductive heating, to a pressure of at least 1 MPa, preferably even of at least 3 MPa. This pressure reflects a force or a force component which acts on the sheetlike element perpendicularly to a side-face section of the heat-activatedly bondable sheetlike element. A force acting perpendicularly in this way is any force which acts on the sheetlike element perpendicularly to an area which stretches within the outer bounds of the sheetlike element. Accordingly, in the case of a sheetlike element whose bond area is formed three-dimensionally in three-dimensional space, the direction from which the force acts on the sheetlike element may also deviate locally, within individual regions of the actual bond area, from the perpendicular direction, although the action of the force overall is perpendicular, relative to a hypothetical action area of the sheetlike element that stretches from the outer margin of the sheetlike element. Merely for the sake of completeness it is noted here that the force which acts may also, furthermore, have components which do not act perpendicularly to the action area, provided that perpendicularly acting components are also present as well.

With this regime of the method, moreover, a further advantageous effect comes about: Low molecular mass compounds, such as water or gases such as air, for example, which at room temperature are present adsorbed in the polymer matrix of the heat-activatedly bonding adhesive layer, typically desorb when the adhesive is heated to the activation temperature. The desorbed compounds of low molecular mass are distributed in the adhesive layer in the form of bubbles, and so the adhesive is undesiredly foamed. The release of low molecular mass compounds under these conditions is, moreover, even more problematic if the at least one heat-activatedly bonding adhesive layer comprises a reactive adhesive in which there is a thermally induced crosslinking reaction in the form of a polycondensation reaction. In this case, byproducts of the crosslinking reaction, eliminated from the polymer network of the adhesive, are low molecular mass compounds, which at the activation temperatures selected in each case are present in the form of gases—as water vapor, for example.

The volumes of gaseous or liquid fluid that are released in these cases may be considerable: Accordingly, heat-activatedly bonding adhesives based on copolyamides may contain water, for instance, in a mass fraction of several percent, adsorbed on the macromolecular network and undergoing partial escape on heating. In that case there is foaming or bubbling within the adhesive, a consequence of which in turn is a reduction in adhesion and cohesion of this adhesive overall; this, therefore, should be avoided.

In the case of heat-activatedly bonding adhesives it has been observed that, in the case of a pressing pressure of more than 0.2 MPa, bubbling caused by gaseous fluids, such as water vapor for instance, which desorb or are produced in a chemical reaction is prevented, with a pressure of more than 0.5 MPa having been found necessary in the case of high crosslinking temperatures. Since the pressure to be used in accordance with the invention is significantly greater than these values, a side effect, therefore, is that bubbling within the adhesive layer is prevented. It should be noted, however, that for low-viscosity adhesives (liquid adhesives, for example) and also for certain thermoplastic adhesives that melt at low temperatures, the adhesive flows out of the bondline at a pressure above 0.2 MPa, and hence for certain applications of the method of the invention the adhesive may be less suitable under certain circumstances.

In principle, in the case of inductive heating, the heating rate may be selected arbitrarily, although heating rates of at least 2.5° C./s and at most 200° C./s have been found to be advantageous, more particularly of at least 10° C./s and at most 100° C./s. Through the top-end limitation of the heating rates, the risk—which increases in line with heating rate—of thermal damage to the adhesives and/or to the bond substrate, and also the risk of uncontrolled melting of the adhesives, are reduced. Such top-end limitation of the heating rate may be achieved, for example, in a simple way through use of an electrically conducting layer consisting of a metal which is a poor conductor of electrical current—i.e., through the use of aluminum instead of copper, or even of nickel instead of aluminum.

Another simple way of limiting the heating rate toward the top end is to use metallic structures spread two-dimensionally in the form of an electrically conducting layer, these structures being perforated or interrupted discontinuously in their two-dimensional extent—in other words, for example, expanded metal, woven wire mesh, braided wire mesh, woven ribbon, braided ribbon, and metal foils with holes or slits.

For adhesive bonding, in accordance with the invention, the entire bond area of the sheetlike element may be inductively heated at the same time, this being possibly sensible in particular in the case of a small bond area with compact geometry, as in the case of a bond area which is circular over a small area, for instance. Instead, however, it is also possible for only part of the whole bond area of the sheetlike element to be inductively heated at the same time, and this may be sensible particularly in the case of a large bond area with open geometry.

Where only part of the whole bond area of the sheetlike element is heated at the same time, this can be achieved, for instance, by altering the position of the preliminary assembly relative to the position of the inductor and the pressing device; if the preliminary assembly is small, the preliminary assembly is preferably guided discontinuously or continuously past a fixedly installed arrangement of inductor and pressing device, while in the case of a large preliminary assembly, it is also possible for the arrangement of inductor and pressing device to be guided continuously or discontinuously past the fixed preliminary assembly.

As a result of this relative movement, a temporal and spatial heating profile is obtained whose parameters can be selected in line with the particular geometry of the final assembly to be produced, and also in line with its subsequent intended use.

If the inductive heating is then carried out such that the entire sheetlike element in each case is heated at the same time, it has in that case emerged as being particularly useful if, at each point in time during the inductive heating, the heated bond area accounts for a large part of the heated region of the sheetlike element. This is the case if, in addition to the regions that contribute to bonding, only a few regions of the sheetlike element that do not contribute to the bonding are heated in each case. It is advantageous here if the ratio between the area of the region of the heat-activatedly bondable sheetlike element which is heated inductively at one point in time (in other words, the regions of the sheetlike element, heated at the same time in each case, that contribute to bonding in the adhesive bond and that do not contribute to bonding in the adhesive bond), and the bond area in this region (that is, the regions of the sheetlike element that contribute to bonding and are heated at the same time in each case) is less than 2:1, more particularly less than 1.5:1 or even less than 1.2:1. As a result, in the region of the sheetlike element that is heated at the same time in each case, the regions which do not contribute to bonding occupy at most the same area as the regions that contribute to bonding, preferably less than half or even only a fifth of the area of the regions that contribute to bonding.

Where the heat-activatedly bondable sheetlike element has only one single heat-activatedly bonding adhesive layer, the sheetlike element may be arranged on the surface of the bond substrate in such a way that it joins it to a further bond substrate in a manner of a bridge. Where, alternatively, the heat-activatedly bondable sheetlike element has a further heat-activatedly bonding adhesive layer in addition to the at least one heat-activatedly bonding adhesive layer, the preliminary assembly may be contacted, prior to inductive heating, with a further bond substrate, the further heat-activatedly bonding adhesive layer of the heat-activatedly bondable sheetlike element of the preliminary assembly being contacted with the further bond substrate.

In the preliminary assembly, the connection between the further heat-activatedly bonding adhesive layer and the further bond substrate may be loose and not yet permanent, and then, in the course of the concluding inductive heating, is activated thermally together with the at least one heat-activatedly bonding adhesive layer. Alternatively, however, this connection may also already be permanently solid, as may be realized, for instance, if the at least one heat-activatedly bonding adhesive layer is different from the further heat-activatedly bonding adhesive layer and at the same time the activation temperature of the at least one heat-activatedly bonding adhesive layer is higher than the activation temperature of the further heat-activatedly bonding adhesive layer. To produce the preliminary assembly, in that case, the further heat-activatedly bonding adhesive layer can first be contacted with the further bond substrate, and the resultant loose pre-preliminary assembly, made up of sheetlike element and the further bond substrate, can be heated by means of a heating apparatus which does not operate inductively, as for instance with a conventional oven, a radiant heater or a contact heater. The pre-preliminary assembly is in this case heated to a temperature at which the further heat-activatedly bonding adhesive layer is already thermally activated, but not the at least one heat-activatedly bonding adhesive layer.

Furthermore, additional method steps may precede or follow the steps of the method of the invention or may be carried out between two steps of the method of the invention. For example, after the end of the inductive heating, the pressure may also be maintained for a subsequent pressing duration, such as during the progress of a thermally activated crosslinking reaction or for the fixing of the adherends during the cooling of the adhesive, in order thus to allow solidification of the bondline through physical or chemical effects. During this subsequent pressing duration, the ultimate assembly already formed may be not heated (with the consequence that, in that case, a further pressing device may be used for the subsequent pressing, said further pressing device not itself having an inductor, the use of a further pressing device thus allowing the cycle time to be reduced), or may be cooled by means of an external cooling unit, or may be heated again during at least part of the subsequent pressing duration, as for example as part of a further inductive heating. In this case, the temperature in the bondline can be maintained, with the subsequent heating being able to be carried out with a lower heating rate or at a lower temperature than the initial heating.

The power introduced by the magnetic field can be influenced in a variety of ways, and all suitable techniques can be employed for this in principle. Thus, for example, the strength of the current flowing through the generator coil may be adapted accordingly. In practice it has been found advantageous, furthermore, to operate the alternating magnetic field with regular interruption (intermittently) and so to influence the effective action time of the alternating magnetic field. In this case, the alternating magnetic field is "pulsed"—that is, switched on and off in cycles. The pulse duration of the alternating magnetic field in the case of inductive heating is typically less than 1 s, more particularly less than 0.1 s, and the pause time between two pulses is less than 1 s, more particularly less than 0.1 s. Through operation with pulselike intermittence, it is possible to achieve an extremely homogeneous heating and to reduce, or even completely avoid, any local overheating.

The method of the invention is used preferably for the adhesive bonding of subassemblies of electronic devices, such as those from the consumer electronics, entertainment electronics or communications electronics segments (for example, for cell phones, PDAs, laptops and other computers, digital cameras, display devices such as, for instance, displays, digital readers or organic light-emitting diode displays (OLEDs), and also for solar cell modules such as, for instance, electrochemical dye solar cells, organic solar cells or thin-film cells). Subassemblies are understood in the present context to refer to all constituents and collections thereof that are used in electronic devices, examples being electronic components (separate and integrated components), casing parts, electronic modules, antennas, display fields, protective screens, unpopulated and/or populated circuit boards, and the like.

The method can be carried out using a pressing device and an inductor customary for inductive heating. Pressing devices used may be all devices suitable for exerting a pressing pressure, examples being discontinuously operating pressing machines such as, for instance, a pneumatic or hydraulic press, an eccentric press, a crank press, a toggle press, a spindle press or the like, or else continuously operating pressing machines such as a pressing roll, for instance. The pressing means may be provided as a separate unit or else may be present in conjunction with the inductor. It is preferred, for instance, to employ a pressing means which as a first pressing tool comprises at least one press-ram element which also has an induction heating means. As a result, the induction field can be brought very close to the bond site to be formed, and thus also can be limited three-dimensionally to the area of this bond site.

Induction heating means (inductors) contemplated include all customary and suitable arrangements, in other words, for instance, coils, conductor loops or conductors through which an alternating electrical current passes, and which generate an alternating magnetic field of appropriate strength as a result of the current flowing through them. Accordingly, the magnetic field strength necessary for heating may be provided by a coil arrangement with an appropriate number of turns and length of coil, through which a corresponding current is flowing, in the form of a point inductor, for example. This point inductor may be designed without a ferromagnetic core, or else may have a core, made of iron or pressed ferrite powder, for example. The preliminary assembly may be exposed directly to the magnetic field thus generated. Alternatively, of course, it is also possible to arrange the above coil arrangement as a primary winding on the primary side of a magnetic field transformer, on whose secondary side a secondary winding provides a correspondingly higher current. As a result, the actual excitation coil, arranged in the immediate vicinity of the preliminary assembly, can have a lower number of turns, as a result of the higher current, without the field strength of the alternating magnetic field being reduced as a result.

Described below are general embodiments of a combined apparatus of this kind, featuring at least one press-ram element and at least one induction heating means integrated therein. Press-ram elements for the purposes of the present invention are all assemblies capable of exerting a defined pressure on an area. Press-ram elements may exert the pressure continuously (in the form of a roller, for instance) or discontinuously (in the form of a press tappet, for instance), it being possible for the pressure exerted to be constant over time or to follow a defined time profile. The apparatus must be adapted for a pressing force of at least 300 N, more particularly of at least 600 N.

In order to exert a corresponding pressure, the at least one press-ram element requires a counter-bearing as a second pressing tool; this counter-bearing may either be of passive form (as a fixed bearing, for instance) or else may play an active part in developing the pressure, in the form of a further press-ram element, for instance. The surface of the at least one press-ram element may in this case be designed in line with the shape that the bond is to have, and thus may have, for example, a flat pressing area or else a pressing area which is curved in three-dimensional space, at least regionally, i.e., may be present at least in a subregion or in two or more subregions of the pressing area. The curved pressing area in this case ought to be designed so as to be complementary to the shape of the respective region of the preliminary assembly.

The counter-bearing (that is, for instance, the fixed bearing or the further press-ram element) advantageously has a—preferably ferrimagnetic—yoke section and, in addition or instead, a further induction heating means. Both have the same effect, namely the effect of increasing the penetration depth of the magnetic field and hence affording uniform heating, meaning that the bond is formed homogeneously over the entire bond area, even in the case of a curvature in three-dimensional space.

Such a yoke section may be formed, for example, of a ferritelike material which has been integrated into the further press-ram element and which attracts the magnetic field locally, concentrates it on the specific bond region, and hence increases its penetration depth. The yoke in this case may be arranged such that it attracts the magnetic field only in the region in which a particularly great penetration depth is needed, with the shape of the yoke section being adapted, for instance, to the shape of the bond area that is to be produced. By using a—preferably ferrimagnetic—yoke section of this kind, on the one hand the lateral extent of the heating field is limited, but on the other hand a sufficient penetration depth of the magnetic field into the bond substrates that are to be joined is provided as well, and so technically rational heat-up rates are achieved. As a result, bonds with geometries which are substantially angular and of small area, in particular, can also be produced with a high level of homogeneity and, as a result thereof, with high strength. Angular bond structures of this kind with angle radii of less than 5 mm cannot be generated with uniform freedom from overheating and hence with a low degree of destruction by conventional methods for inductive heating, and so the existing bonds typically have substantially round or at least highly rounded geometries.

A boost to the locally acting alternating magnetic field in the bondline can also be achieved, furthermore, by means of an additional induction heating means in the further press-ram element. For this purpose it is useful to tailor the phase position of this alternating magnetic field of the further induction heating means to the phase position of the alternating magnetic field of the at least one induction heating means, or even to synchronize these phase positions, so that the magnetic fields do not cancel out one another and hence weaken one another, but instead reinforce one another.

Figure 2:
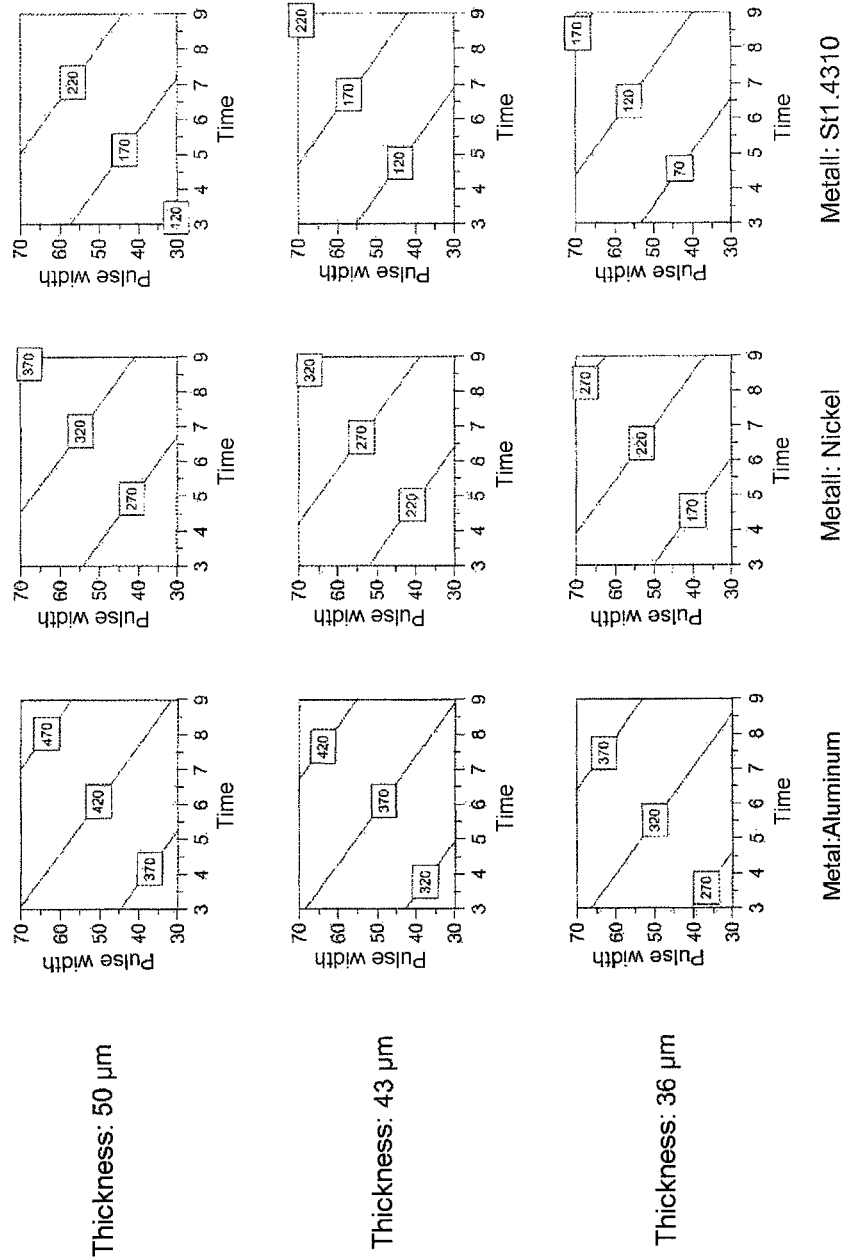
Figure 3:
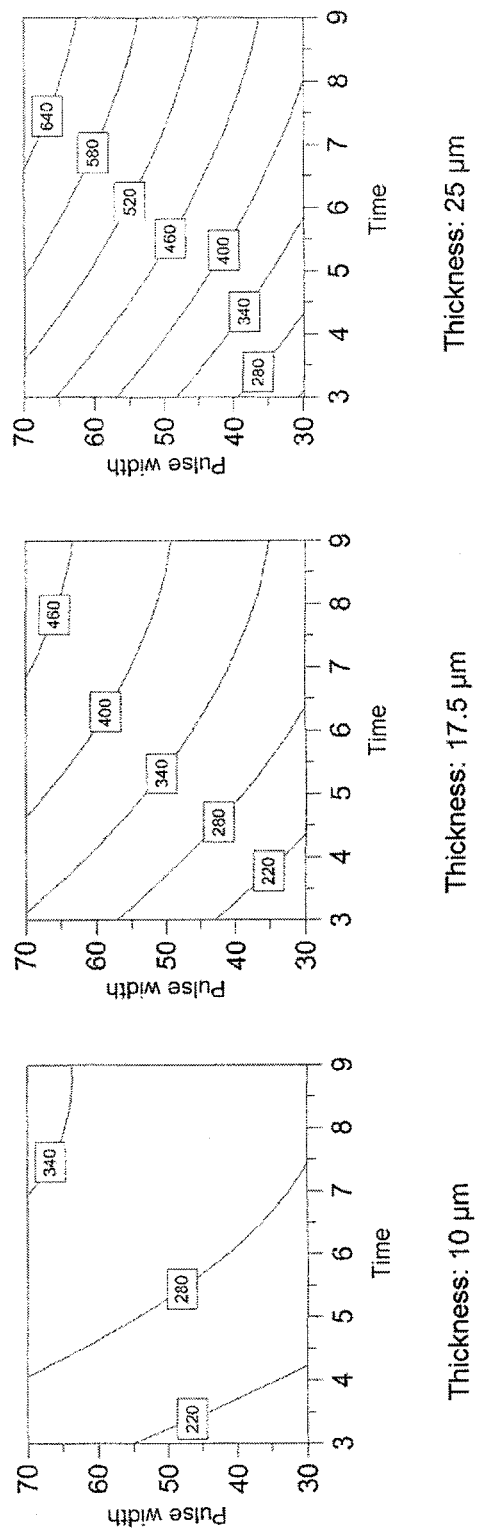
Figure 4:
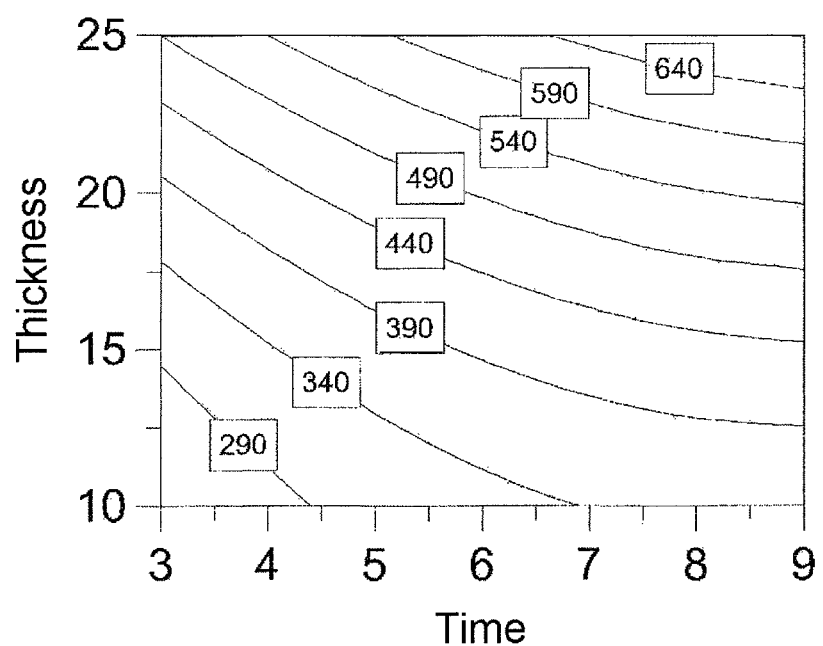
Figure 5:
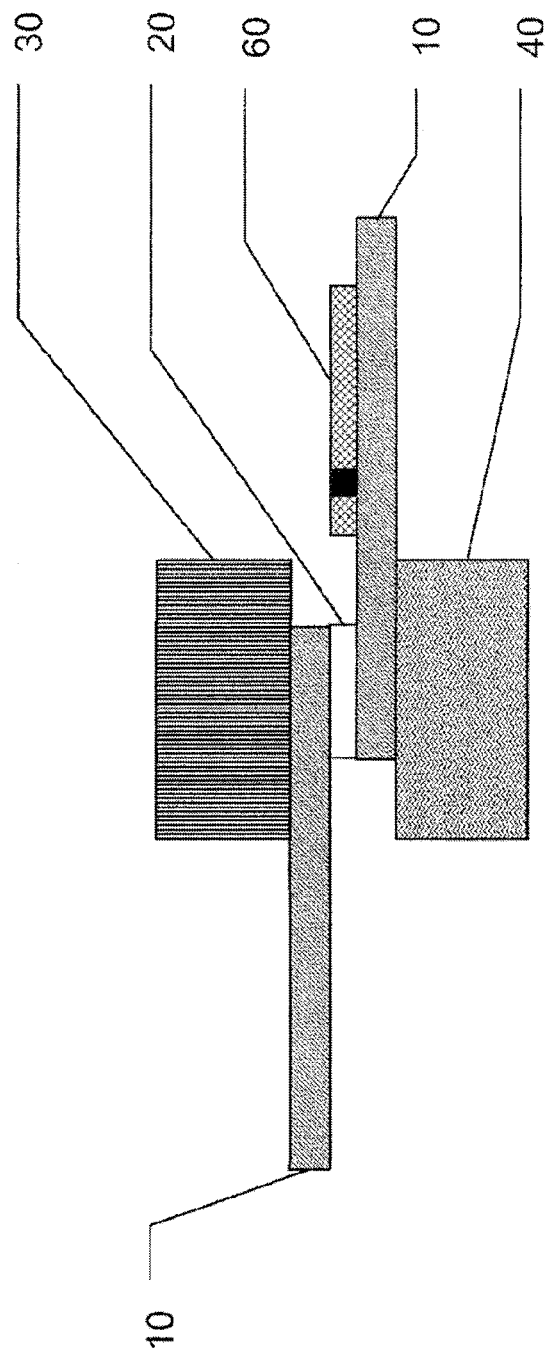
Figure 6:
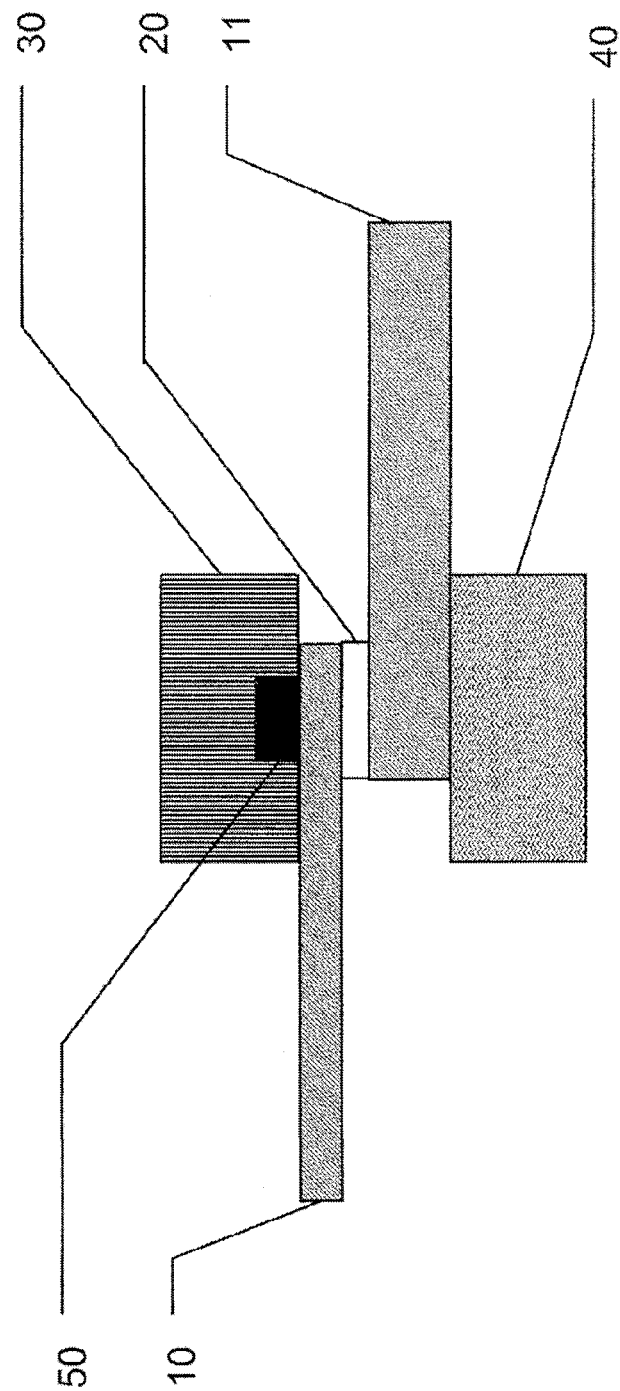

Further advantages and application possibilities will become apparent from the results of investigation that are to be described in more detail in the text below, with reference to the appended drawings. In those drawings FIG. 1 shows diagrammatically a longitudinal section through an experimental setup for implementing the method of the invention, this setup having been used to investigate the principle of the invention;

FIG. 2 shows contour diagrams of the bond strength achieved as a function of the pulse duration of an intermittent alternating magnetic field and as a function of the duration of exposure to the alternating magnetic field, the individual diagrams having been produced for heat-activatedly bondable sheetlike elements, which differ in terms of the material and of the thickness of the electrically conducting layer;

FIG. 3 shows contour diagrams of the bond strength achieved as a function of the pulse duration of an intermittent alternating magnetic field and as a function of the duration of exposure to the alternating magnetic field, the individual diagrams having been produced for heat-activatedly bondable sheetlike elements having particularly thin electrically conducting layers, and differing in terms of the thickness of the electrically conducting layer;

FIG. 4 shows a contour diagram of the bond strength achieved as a function of the thickness of the electrically conducting layer and of the duration of exposure to the alternating magnetic field for a heat-activatedly bondable sheetlike element;

FIG. 5 shows schematically a longitudinal section through a second experimental setup for implementing the method of the invention, used in further investigations on the principle of the invention; and FIG. 6 shows schematically a longitudinal section through a third experimental setup for implementing the method of the invention, used in further experiments relating to the suitability of the principle of the invention for the intended purpose.

Investigations on the samples took place in the arrangement shown schematically in FIG. 1. For this purpose, two polycarbonate plates 10 ("polycarbonate rods") with a width of 20 mm, a length of 100 mm, and a thickness of 3 mm were bonded to one another as bond substrates using different heat-activatedly bondable sheetlike elements 20 in accordance with the method of the invention, the bond substrates overlapping by 10 mm in the bondline and so forming a rectangular bond area having an edge length of 10 mm×20 mm. For comparative investigations, one of the two polycarbonate plates 10 was replaced by an aluminum plate of the same area, with a thickness of 1.5 mm.

The heat-activatedly bonding adhesive layer used, unless otherwise described, was a heat-activatedly bondable adhesive tape featuring an adhesive based on nitrile rubber and phenolic resin, said tape being available under the designation tesa HAF 84xx in different thicknesses (the different thicknesses are evident from the product name on the basis of the specific figures for the "xx" part indicated as spacers). In these investigations, adhesive layers with a thickness of 30 μm (tesa HAF 8405) and adhesive layers with a thickness of 60 μm (tesa HAF 8410) were employed.

The model structure used for the electrically conducting layer was a metal foil of defined composition and thickness. Laminated to each side of this foil was an adhesive layer, at a temperature of 100° C., producing a double-sidedly heat-activatedly bondable sheetlike element with adhesive layers of identical composition on the two side faces of the metal foil. At this laminating temperature, the chemical crosslinking reaction within the adhesive is not yet initiated; instead, merely attachment of the adhesive layers to the metal foil is made possible. Investigations were carried out for layer thicknesses in the range from 10 μm to 50 μm on foils made of aluminum, copper, nickel, iron, and steel (St1.4310).

The bonding method was carried out using a modified induction system of type EW5F from IFF GmbH, Ismaning. Serving as the inductor for local provision of the alternating magnetic field here is an induction field transformer composed of just one water-cooled current-bearing conductor, which is used as a secondary coil circuit in a transformer-field transformer and which interacts in a coaxial transformer with the transformer field generated on the primary coil side. The induction field transformer was embedded into a matrix of polyetheretherketone (PEEK) and the resultant arrangement was used as the lower press-ram element 40 of a press device. The applied pressure between the lower press-ram element 40 and an upper press-ram element 30, being the pressure applied to the preliminary assembly perpendicularly to the side faces of the heat-activatedly bondable sheetlike element, was 2 MPa in each case.

With the aid of the modified induction unit, alternating magnetic fields with a frequency from a range from 10 kHz to 30 kHz, with a pulse width from a range from 30% to 70%, were generated for the investigations. The pulse width indicates the percentage fraction of the pulse duration (pulse length) of the alternating magnetic field as a proportion of the overall period duration (the sum of pulse duration and the duration of the pauses between two successive pulses) of the alternating magnetic field. The time for which the heat-activatedly bondable sheetlike element was exposed to the pulsed alternating magnetic field (i.e., the duration of inductive heating) here was in a range from 3 s to 9 s. All experiments were carried out, furthermore, with a subsequent pressing time of 10 s, within which there was inductive after heating in an alternating magnetic field of the same frequency as for the thermal activation of the adhesives, with a pulse width of 20% (corresponding to a ratio of pulse duration to pause duration of 1:4).

In order to investigate the fundamental suitability of the method of the invention, the heat-activatedly bonding adhesive layer used first was a bondable adhesive tape based on synthetic rubber and epoxy resin (tesa HAF 8863; thickness: 50 μm). Whereas for the nitrile rubber-phenol is resin adhesive tapes used as a realistic model adhesive layer in the other experiments a byproduct is produced during adhesive bonding, in a polycondensation reaction, and this byproduct, in the case of a low applied pressure, results in foaming of the adhesive layer, this is not the case with adhesive layers based on synthetic rubber and epoxy resin. These systems, therefore, are particularly suitable for investigating information on any thermal degradation events as a function of the particular method regime, without the investigation being impaired by severe foaming of the adhesive layer.

For this purpose, at a temperature of 100° C., one of these layers of adhesive was laminated to each side face of an aluminum foil 36 μm in thickness. At such a low laminating temperature, the chemical crosslinking reaction is not yet initiated; instead, merely attachment of the adhesive layers to the metal foil is made possible, producing a kind of preliminary assembly for a double-sidedly heat-activatedly bondable sheetlike element.

Inductive heating was subsequently carried out using the modified induction system, by application of an alternating magnetic field with a frequency of 20 kHz and a pulse width of 70% for a duration of 9 s. In order to investigate the influence of the applied pressure on any thermal degradation, in this series of experiments, identical samples were subjected to different applied pressures, and the resulting bond was inspected. The applied pressures used were 0.2 MPa, 0.5 MPa, 0.8 MPa, 1 MPa, 2 MPa, and 3.5 MPa.

On subjection to an applied pressure of less than 1 MPa, there was generally discoloration of the adhesive layers, in the form of dark regions, in the course of the inductive heating. Such blackening was observed particularly on the margins of the test section investigated in each case, and was attributed to thermal degradation of the adhesive layer. No such blackening was perceptible, in contrast, when the applied pressure was 1 MPa or more. Accordingly, it is evident that, through use of the method of the invention, the incidence of thermal damage to the adhesive layers during inductive heating is also prevented or at least significantly reduced.

In other investigations, the bond strength was ascertained as a parameter for the quality of the bond obtained, this bond strength being that of the resultant assembly and being ascertained for different heat-activatedly bondable sheetlike elements and for different method parameters. For this purpose, the bond strength was determined quantitatively (in N/cm$^2$) at a testing speed of 1 mm/min in each case in a dynamic tensile shear test in accordance with DIN 53283 at 23° C. A representative selection of the results of the comprehensive experimental series of these investigations is given in the individual diagrams of FIGS. 2, 3 and 4.

Each individual diagram shows a contour diagram in which the individual bond strength determined (in N/cm²) is shown in the form of contour lines as a function of the duration (in s) of inductive heating (abscissa) and also of a further variable (the percentage pulse width (in %) or the layer thickness (in μm) of the electrically conducting layer; ordinate); the respective dynamic bond strength value is indicated on the associated contour line (isodyne). It can be seen in all of the contour diagrams that the bond strength generally increases in line with the duration of inductive heating and with increasing pulse width or increasing layer thickness.

FIG. 2 shows measurement series for different metal foils as electrically conducting layer; the columns shown, from left to right, a layer of aluminum, a layer of nickel, and a layer of the steel St1.4310, and the rows, from top to bottom, show different layer thicknesses of these electrically conducting layers, of 50 μm, 43 μm, and 36 μm. The heat-activatedly bonding adhesive layer laminated onto each of the two side faces of a metal foil in each case was a double-sidedly bondingly treated adhesive tape (tesa HAF 8410) with a thickness of 60 μm.

The diagrams show the bond strengths obtained in each case, as a function of the pulse duration of an intermittent alternating magnetic field during adhesive bonding (aftertreatment took place always with a pulse width of 20%), and as a function of the duration of exposure to the alternating magnetic field.

In these investigations it was found that, using electrically conducting layers of magnetic metals (in the case of nickel and St1.4310), the bond strength attained was significantly lower than when using nonmagnetic aluminum foils of the same layer thickness. Accordingly, in the case of the magnetic metals, a lower heat-up performance of the alternating magnetic field was absorbed than in the case of the nonmagnetic metal. This finding is surprising, since the actual expectation was that, using magnetic metals, the eddy current heating would combine with the heating from magnetic reversal losses, and hence that the heat-up rate would be higher. Experimentation, however, was unable to confirm this.

FIG. 3 shows a measurement series for thin copper foils as electrically conducting layer, the diagrams from left to right being obtained for copper foil layer thicknesses of 10 μm, of 17.5 μm, and 25 μm. The heat-activatedly bonding adhesive layer laminated to each of the two side faces of a copper foil in each case was a double-sidedly bondingly treated adhesive tape (tesa HAF 8405) with a thickness of 30 μm, meaning that the thickness of the heat-activatedly bonding adhesive layers in the laminate remained constant in this measurement series. It was observed that, as the thickness of the electrically conducting layer increased, higher strengths were achieved, and this is interpreted as an increase in the alternating magnetic field heating power absorbed by the electrically conducting layer.

FIG. 4 shows a contour diagram for a sheetlike element having a copper foil as its electrically conducting layer, the pulse duration (pulse width) of the intermittent alternating magnetic field in this case being 70% for all of the measurement data. Accordingly, the data shown in FIG. 4 correspond to a compilation view of the data shown in the individual diagrams of FIG. 3, at the upper margin of the individual diagrams. From the resultantly evident dependence of the bond strength on the thickness of the electrically conducting layer it can be seen that, with thin heat-activatedly bondable sheetlike elements, very high bonding strengths can be realized, even with short heat-up times, and these bonding strengths were able to be set with a high degree of reproducibility, by means of the method parameters.

For comparative measurements, the heat-activatedly bondable sheet like element used was a heat-activatedly bonding adhesive layer having a thickness of 60 μm (tesa HAF 8410) without an electrically conducting layer. Using this sheetlike element, one of the above-described polycarbonate plates was bonded to an aluminum plate of the same area that possessed a thickness of 1.5 mm. The switch of one polycarbonate plate for an aluminum plate was necessary in order to ensure sufficiently high thermal conductivity of the bond substrate, allowing the heat necessary to activate the adhesive to be introduced into the preliminary assembly from the outside, by a heating press (contact heating method) for the comparative experiment. For activation, the preliminary assembly was heated under a pressure of 2 MPa for 5 s or for 10 s. The bonding strength of the resultant assembly was determined as 610 N/cm² for a heating duration of 5 s and 640 N/cm² for a heating duration of 10 s.

In comparison with the results shown in FIGS. 2, 3 and 4, the comparative experiments demonstrate that, through use of the method of the invention, adhesive bonds can be produced with the same bonding strength as in a conventional contact heating method. This result is surprising, since, in the sheetlike element used, as a result of the metal foil arranged in the interior of the sheetlike element, a greater number of interfaces are present than in the comparative example, it being specifically at these interfaces that particularly severe weakening of the assembly is typically observed, as a consequence, for instance, of an accumulation of thermal decomposition products from adhesive at the metal foil, and of an associated detachment of the adhesive layer from the metal foil at this interface, which is designed anyway as a weakening face of the assembly.

The examples therefore show, then, that with the method of the invention it is possible to produce adhesive bonds which are at least equivalent to the adhesive bonds obtainable in conventional methods; that there are no problems in bridging a distance between inductor and bondline of 3 mm; and that, at the same time, moreover, bonding times of less than 10 s can be realized.

It was an object of the method of the invention to avoid instances of thermal damage, particularly to electronic components, in the course of adhesive bonding. In order to examine whether the method of the invention is suitable in principle for achieving this object, bonding was carried out in the immediate vicinity of an electronic subassembly, in a further experiment. For this purpose, in the general setup shown in FIG. 5, two polycarbonate plates 10 ("polycarbonate rods") were bonded to one another via a heat-activatedly bondable sheetlike element 20, in accordance with the method of the invention, using a lower press-ram element 30 and an upper press-ram element 40, which had an integrated inductor; on one of the two polycarbonate plates 10, an RFID label 60 (from Rako) modified in terms of the antenna arrangement, having a printed antenna and an RFID chip connected to said antenna, was fastened such that the distance between the margin of the bond area and the RFID chip was 5 mm. Care was taken here to ensure that the metallic components of the RFID label 60 were not located directly above that region of the lower press-ram element in which the inductor heating means was disposed. The bond area was inductively heated for a time of 10 s with a pulse width of 70%, and the resultant assembly was likewise subjected to the aftertreatment specified above.

After adhesive bonding had taken place, the RFID label (more particularly the RFID chip) was investigated for its functionality. No adverse effect on the functionality of the RFID label was observed here. Where the adhesive bond was obtained by means of contact heating methods, in contrast, it was no longer possible to read from the RFID chip.

In further comparative experiments, however, in which the RFID label was inductively heated under pressure and thereby bonded, the inductor and the press device were designed as separate units. In these further experiments, it was still possible to read from most of the RFID chips after bonding, but the proportion of the RFID chips from which reading was no longer possible was considerably greater than when using an integrated device, where hardly any RFID chip was impaired. The significantly lower risk of damage to the RFID chips in the course of bonding was attributed to the greater three-dimensional concentration of the magnetic field when an integrated device is used.

The experiments above demonstrate that the method of the invention is actually suitable for realizing the gentle adhesive bonding desired.

Finally, in a further experimental series, an investigation took place into the efficiency of a ferrimagnetic yoke section arranged in one of the two press-ram elements of the pressing/heating device; the experimental arrangement is shown schematically in FIG. 6.

A heat-activatedly bondable sheetlike element 20 having an electrically conducting layer of aluminum with a layer thickness of 50 µm and two heat-activatedly bonding adhesive layers with a thickness each of 60 µm (tesa HAF 8410) was bonded to both sides of the aluminum layer between an upper polycarbonate plate 10 and a lower polycarbonate plate 11. In contrast to the above-described experiments, the thickness of the lower polycarbonate plate 11, located, on bonding, in direct contact with the lower press-ram element 40, which also contains the induction heating means (the inductor), was varied here; plates with thicknesses of 3 mm, 6 mm, and 9 mm were used. Additionally, a ferrite yoke 50 was inserted as a yoke section into the upper press-ram element 30, this yoke section having a length of 30 mm length, a width of 5 mm width and a height of 5 mm likewise. The yoke was arranged directly over the bond line, with the longitudinal axis of the bondline being aligned in accordance with the longitudinal axis of the yoke.

Here again, inductive heating took place under the conditions described above, with a pressing pressure of 2 MPa, a warm-up duration of 10 s, and an aftertreatment. The resultant assembly was investigated for its bonding strength (in $N/cm^2$ in each case) in a dynamic tensile shear test in accordance with DIN 53283 at 23° C., with a testing speed of 1 mm/min. As comparative experiments, bonds were produced under the same conditions, but without a yoke in the upper press-ram element 30 used in these experiments.

For a lower bond substrate with thicknesses of 3 mm, 6 mm, and 9 mm, bonding strengths of 490 $N/cm^2$, 480 $N/cm^2$, and 260 $N/cm^2$, respectively, were found when using a yoke 50. Correspondingly, when the upper press-ram element 30 did not have a yoke, bond strengths of 510 $N/cm^2$, 240 $N/cm^2$, and 50 $N/cm^2$, respectively, were found. It can therefore be seen that the effect of the thickness of the lower bond substrate on the bond strength achieved was considerably greater when no yoke was used, whereas a lower effect was observed when a yoke was employed. This shows the advantageous effect of a yoke in the upper part of the pressing tool, on account of the possibility that then exists of carrying out homogeneous bonding even of thick-wall components or three-dimensionally curved components, for which the distance between bondline and inductor is therefore very great or even different.

The exemplary experiments described above therefore demonstrate the outstanding suitability of the method of the invention and of the device of the invention for generating robust bonds in a gentle way in electronic devices among others.

The invention claimed is:

1. A method for adhesively bonding a heat-activated bondable sheet like element to a bond substrate, having a thermal conductivity coefficient of at most 5 W/me, the method comprising:
    providing a heat-activated bondable sheet like element having at least one electrically conducting layer and at least one heat-activatedly bonding adhesive layer, wherein the heat-activatedly bondable sheetlike element has a shape cut to the shape of a bond area,
    contacting at least a region of a surface of the bond substrate with at least part of a side-face section of the heat-activatedly bondable sheetlike element to form a preliminary assembly,
    inductively heating, via an induction heating means integrated into a pressing tool, the preliminary assembly in an alternating magnetic field with a frequency of at least 100 Hz and at most 200 kHz for a time duration of at most 20 seconds to form a final assembly, wherein the induction heating means is in a form of a point inductor having a core made of iron or pressed ferrite powder, and
    subjecting, simultaneously with the inductive heating, the preliminary assembly, perpendicularly to a side-face section of the heat-activatedly bondable sheetlike element, to a pressure of at least 1 MPa, via at least one press-ram element of the pressing tool.

2. The method of claim 1, wherein the heat-activatedly bondable sheetlike element is a sheetlike element in which use is made as the at least one electrically conducting layer of a layer having a layer thickness of less than 75 µm.

3. The method of claim 2, wherein the at least one electrically conducting layer has a layer thickness of less than 30 µm.

4. The method of claim 3, wherein the at least one electrically conducting layer has a layer thickness of less than 15 µm.

5. The method of claim 1, wherein the heat-activatedly bondable sheetlike element is a sheetlike element having a minimum strut width of less than 5 mm.

6. The method of claim 5, wherein the heat-activatedly bondable sheetlike element has a minimum strut width of less than 3 mm.

7. The method of claim 1, wherein a ratio of an area of each simultaneously inductively heated region of the heat-activatedly bondable sheetlike element to the bond area in that region is less than 2:1.

8. The method of claim 7, wherein the ratio of an area of each simultaneously inductively heated region of the heat-activatedly bondable sheetlike element to the bond area in that region is less than 1.5:1.

9. The method of claim 1, wherein the induction heating means is an induction field transformer embedded into a matrix of material of a first press-ram of the pressing tool.

10. The method of claim 9, wherein the matrix of material is a matrix of polyetheretherketone.

11. The method of claim 1, wherein the heat-activatedly bondable sheetlike element is a sheetlike element having a further heat-activatedly bonding adhesive layer, and wherein the preliminary assembly, prior to the inductive heating, is contacted with a further bond substrate, wherein the further heat-activatedly bonding adhesive layer of the heat-activatedly bondable sheetlike element of the preliminary assembly is contacted with the further bond substrate.

12. The method of claim 1, wherein the heat-activatedly bondable sheetlike element is a sheetlike element whose shape is adapted for an open bond area geometry.

13. The method of claim 1, wherein use is made as the bond substrate of a bond substrate which has a bond area curved in three-dimensional space.

14. The method of claim 1, wherein even after an end of the inductive heating, the pressure is maintained for a subsequent pressing duration, wherein the final assembly is subjected to further inductive heating during at least part of a subsequent pressing duration.

15. The method of claim 1, wherein the heating rate for the inductive heating is at least 2.5° C./s and at most 200° C./s.

16. The method of claim 1, wherein the inductive heating means is an inductor directly integrated into the at least one press-ram element of the pressing tool such that a distance between the inductor and the heat-activatedly bondable sheetlike element is minimized when the preliminary assembly is inductively heated.

17. The method of claim 1 for adhesively bonding subassemblies of electronic devices.

18. The method of claim 1, wherein the duration of time is greater than 3 seconds and up to 9 seconds.

19. A method for adhesively bonding a heat-activated bondable sheet like element to a bond substrate, having a thermal conductivity coefficient of at most 5 W/me, the method comprising:

providing a heat-activated bondable sheet like element having at least one electrically conducting layer and at least one heat-activatedly bonding adhesive layer, wherein the heat-activatedly bondable sheetlike element has a shape cut to the shape of a bond area, contacting at least a region of a surface of the bond substrate with at least part of a side-face section of the heat-activatedly bondable sheetlike element to form a preliminary assembly, inductively heating, via an induction heating means integrated into a first press-ram element of a pressing tool, the preliminary assembly in an alternating magnetic field with a frequency of at least 100 Hz and at most 200 kHz for a time duration of at most 20 seconds to form a final assembly, wherein a second press-ram element of the pressing tool comprises at least one ferromagnetic yoke section, ferrimagnetic yoke section, paramagnetic yoke section or diamagnetic yoke section, and subjecting, simultaneously with the inductive heating, the preliminary assembly, perpendicularly to a side-face section of the heat-activatedly bondable sheetlike element, to a pressure of at least 1 MPa, via at least one of the first press-ram element and the second press-ram element of the pressing tool.

\* \* \* \* \*